(12) United States Patent
Miftakhov

(10) Patent No.: US 11,708,153 B2
(45) Date of Patent: Jul. 25, 2023

(54) ELECTRIC ACCELERATION ASSIST FOR SHORT TAKEOFF AND LANDING CAPABILITIES IN FIXED-WING AIRCRAFT

(71) Applicant: ZeroAvia, Inc., Hollister, CA (US)

(72) Inventor: Valery Miftakhov, San Carlos, CA (US)

(73) Assignee: ZeroAvia, Inc., Hollister, CA (US)

( * ) Notice: Subject to any disclaimer, the term of this patent is extended or adjusted under 35 U.S.C. 154(b) by 125 days.

(21) Appl. No.: 16/798,298

(22) Filed: Feb. 22, 2020

(65) Prior Publication Data

US 2021/0261242 A1   Aug. 26, 2021

(51) Int. Cl.
*B64C 25/40*   (2006.01)
*B64C 25/32*   (2006.01)

(52) U.S. Cl.
CPC .................................. *B64C 25/405* (2013.01)

(58) Field of Classification Search
CPC .................................................. B64C 25/405
USPC ...................................................... 244/103 R
See application file for complete search history.

(56) References Cited

U.S. PATENT DOCUMENTS

| | | | |
|---|---|---|---|
| 3,801,372 A | 4/1974 | Shaw | |
| 3,874,619 A * | 4/1975 | Collins | B64C 25/405 244/50 |
| 5,106,035 A | 4/1992 | Langford | |
| 5,810,284 A | 9/1998 | Hibbs et al. | |
| 6,119,979 A | 9/2000 | Lee et al. | |
| 6,322,915 B1 | 11/2001 | Collins et al. | |
| 6,568,633 B2 | 5/2003 | Dunn | |
| 9,688,392 B2 | 6/2017 | Kawalkar | |
| 10,587,122 B2 * | 3/2020 | Bruce | H01B 9/02 |
| 2001/0018138 A1 | 8/2001 | Iwase | |
| 2002/0005454 A1 | 1/2002 | MacCready et al. | |
| 2006/0065779 A1 * | 3/2006 | McCoskey | B64F 1/28 244/100 R |
| 2012/0292437 A1 * | 11/2012 | Garcia | B64C 25/405 244/58 |
| 2013/0026284 A1 * | 1/2013 | Christensen | B64C 25/405 244/50 |
| 2014/0225421 A1 * | 8/2014 | Oswald | B64C 25/405 301/6.2 |

(Continued)

FOREIGN PATENT DOCUMENTS

| | | | |
|---|---|---|---|
| DE | 19821952 A1 | 11/1999 | |
| GB | 2525057 A * | 10/2015 | B64C 25/40 |

(Continued)

OTHER PUBLICATIONS

Honeywell/Safran Tests EGTS Electric Taxiing System Jul. 26, 2013. https://www.youtube.com/watch?v=NG6ODNJ6nck.*

(Continued)

*Primary Examiner* — Christopher P Ellis

(57) ABSTRACT

In one or more embodiments, the ground roll assist system is based on the electric in-wheel motors integrated with the main landing gear of an aircraft and linked to the aircraft control system. It is well known that modern electric motors possess superior torque density characteristics, potentially exceeding best in class internal combustion engines by more than an order of magnitude. Furthermore, electric motors performance is generally thermally limited, which makes it possible to achieve even higher performance for a short period of time.

16 Claims, 1 Drawing Sheet

(56) References Cited

U.S. PATENT DOCUMENTS

| | | | |
|---|---|---|---|
| 2016/0221669 A1* | 8/2016 | Didey | B64C 25/34 |
| 2016/0318604 A1* | 11/2016 | Guery | B64C 25/50 |
| 2017/0029096 A1* | 2/2017 | Didey | F16C 23/086 |
| 2017/0113788 A1* | 4/2017 | Essinger | B64C 25/64 |
| 2017/0129594 A1* | 5/2017 | Essinger | B64C 25/64 |
| 2019/0077500 A1* | 3/2019 | Kipp | B60T 8/1703 |
| 2019/0344883 A1* | 11/2019 | Brezina | B64C 37/00 |
| 2019/0375512 A1* | 12/2019 | Ribeiro | B64D 35/02 |
| 2020/0102068 A1* | 4/2020 | Mombrinie | B64C 25/24 |

FOREIGN PATENT DOCUMENTS

| | | | | |
|---|---|---|---|---|
| GB | 2537860 A * | 11/2016 | | B64C 25/34 |
| JP | 2009023628 A * | 2/2009 | | |
| JP | 2009023628 A | 2/2009 | | |
| JP | 2009023629 A * | 2/2009 | | |
| JP | 2009023629 A | 2/2009 | | |
| WO | 2014198920 A1 | 12/2014 | | |
| WO | WO-2021064385 A2 * | 4/2021 | | B60L 1/02 |

OTHER PUBLICATIONS

Sharon Thomas and Marcia Zalbowilz, "Fuel Cells—Green Power"; Los Alamos National Laboratory; Los Alamos New Mexico; 26 pages.

International Search Report and Written Opinion issued by the European Patent Office in connection with International Application No. PCT/US2021/018542 dated Nov. 25, 2021.

* cited by examiner

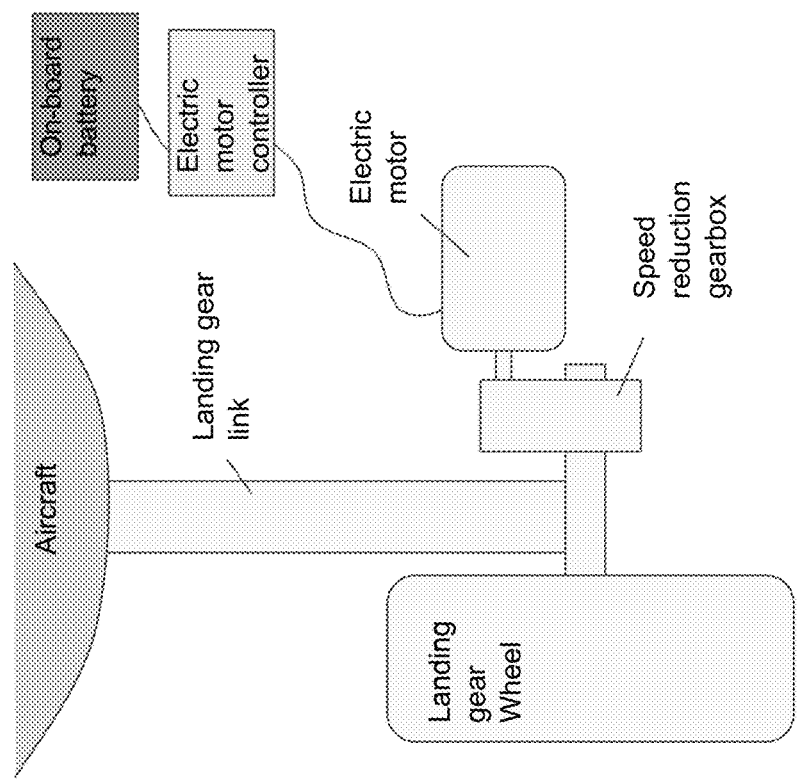
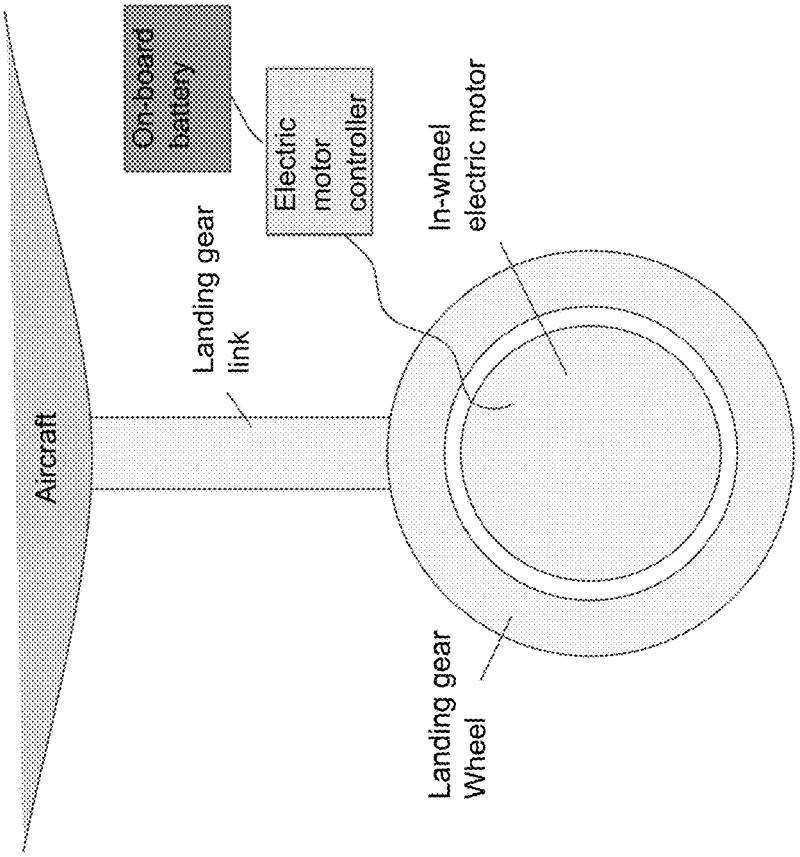

ELECTRIC ACCELERATION ASSIST FOR SHORT TAKEOFF AND LANDING CAPABILITIES IN FIXED-WING AIRCRAFT

BACKGROUND OF THE INVENTION

Field of the Invention

The disclosed embodiments relate in general to air transportation systems technology, and, more specifically, to an electric acceleration assist for short takeoff and landing capabilities in fixed-wing aircraft.

Description of the Related Art

Short take-off and landing (STOL) is a desirable capability in today's aircraft. It dramatically increases potential market applications of an aircraft, making it possible to take off and land on short and/or unimproved surfaces. As the commercial aircraft size continued to increase over the last decades, longer and longer runways were required to enable operation of such aircraft. As a result, only a very small fraction of the available airports worldwide are now used for commercial traffic. For example, only 3% of all airports are carrying 97% of the commercial passenger traffic in the United States, due to the fact that vast majority of airports have runway lengths below 5,000 feet and are not compatible with large jet aircraft requirements—generally 6,000-12,000 feet.

Generally, the runway length requirement is determined by takeoff roll required as the typical landing roll is much shorter. This happens due to the two main factors—the aircraft is generally significantly lighter when it lands, having burned off a significant part of the fuel, and the deceleration capabilities of the aircraft are generally much higher than the acceleration capabilities of airliner's engines (for braking, aircraft can use not only reverse thrust of the engines, but also aerodynamic spoilers/brakes, and mechanical wheel brakes, as well).

Therefore, if a solution is created that significantly improves takeoff roll performance of common aircraft, it will result in immediate and significant positive impact on air travel. Among other things, it will increase utilization of smaller airports and allow much wider reach of air travel, enabling more point to point transportation, dramatically improving overall passenger experience. We describe such a solution below.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary embodiment of an electric acceleration assist system for short takeoff and landing capabilities in fixed-wing aircraft.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

We propose a ground roll electric assist system based on the electric motors integrated with the main landing gear of an aircraft and linked to the aircraft control system. This approach will exploit much high traction efficiency of the rubber wheels relative to the jet engine at low aircraft speeds, and an extremely good torque capabilities of the electric motors.

Such motors can be integrated via in-wheel placement or via a placement on the side of the wheel and connected to the wheel via a gearbox. Examples of such arrangements are given in FIG. 1. These motors would be controlled by the dedicated landing gear motor controllers, that manage the flow of electrical power between the onboard aircraft battery and the motors. Such power management occurs per the control algorithm based on the aircraft throttle and brake actuation In one or more embodiments, when the pilot advances the throttle during the ground operations, the command is transmitted to the landing gear motor controllers to increase positive torque, consuming power from the battery and helping accelerate the aircraft. In addition to reducing the takeoff roll, such landing gear arrangement can also dramatically reduce the ground-based emissions from the commercial aircraft. Such emissions are estimated to be around 5% of all aircraft emissions, therefore the proposed approach can drive a significant improvement in overall fuel consumption, emissions, and operating costs.

Conversely, when the pilot presses on brakes, the command is transmitted to the landing gear motor controllers to increase negative torque and provide additional braking action to the wheels. This will not only reduce the ground landing roll distance, but also help increase the useful life of the traditional friction brakes, as well as reduce the likelihood of brake overheating—a significant source of emergency situations in commercial aircraft. Such a method would also convert the kinetic energy of the decelerating aircraft into the electric energy that would go back to the onboard battery, instead of heat dissipation in the brakes. This would further allow to reduce the amount of net energy used in ground operations of the aircraft.

It is well known that modern electric motors possess superior torque density characteristics, potentially exceeding best in class internal combustion engines by more than an order of magnitude. Furthermore, electric motors performance is generally only thermally limited (as opposed to mechanical limits on traditional combustion engines), which makes it possible to achieve even higher performance for a short period of time.

An example of such performance in a production vehicle is a Tesla Model S vehicle accelerating its mass of 5,000 lbs at above 1G to 55 kts using its two 70lb motors. This corresponds to the specific thrust ratio of ~40× (ratio of the thrust produced to the weight of the motors).

In one or more embodiments, to model the applicability of such an invention to modern aircraft, let us consider a Boeing 737-800, the most popular aircraft currently in the US. It has a maximum takeoff weight of 174,200 lbs, and requires 7,600 ft of runway to take off with it's two engines producing 230 kN of thrust at full power.

Let us assume that we would like to decrease the takeoff roll of this aircraft to half of its current value, and enable it to take off from runways as short as 3,800 ft. It is well known that to achieve a 2× reduction in the distance it takes to achieve a given velocity, the acceleration has to be increased by a square root of 2, or by 1.41×. Therefore, we would need to provide 41% of additional thrust via our electric in-wheel system. 41% of the stock engine thrust is 48 kN, or, expressed in the units of weight, about 11,000 lbs. From the above Tesla example, we know that we could achieve such thrust with a motor system that has a combined weight of just 300l bs, a little more than a weight of a single passenger with luggage. Furthermore, such a system would cost only a few thousand dollars to implement, making it extremely commercially attractive.

In one embodiment, such a motor system would be integrated into every wheel of the aircraft's main landing gear, to provide excellent redundancy in any potential failures of the gear components. For our example of a 737-800 aircraft, this would mean four redundant assist systems— better redundancy factor than the aircraft's primary propulsion.

Possible Implementation Details:

An example of the motors with high torque and power densities that do not require excessive gear reduction ratios is YASA P400 series. Several of such motors or motor cores can be combined together to provide the required torque levels. For our 737 example, 2-3 such motors would be required per aircraft side.

The onboard battery has to be able to provide enough energy to execute full takeoff assist run. A typical takeoff run lasts 30 seconds. At approximately 1 megawatt of total electrical power required to power takeoff assist in a 737 size aircraft, 30 second run would require less than 10 kwh of electrical energy. A 15 kWH LiFePo4 high-voltage (750V nominal) battery would be a good choice due to the inherent safety of this chemistry, very high power density, and still reasonably high energy density. One example of specific manufacturer is A123 nanophosphate battery, rated at 60 C burst discharge rates. At 140 WH/kg, a 15 kWh battery would weigh approximately 100 kg. Such battery could of course also be used for other aircraft needs, in which case there may be no incremental weight addition.

Motor control can be implemented using available off-the-shelf motor controllers matched to the motors, such as RMS-150 family from Borg Warner/Rinehart Motion Systems.

Overall control algorithm can be implemented using conventional aircraft controllers similar to the standard brake/throttle controllers used today. Such controllers would take information from brake pedal and throttle level position sensors to enable actuation of the landing gear motors.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in aircraft power plants. It is intended that the specification and examples be considered as exemplary only, with a true scope and spirit of the invention being indicated by the following claims.

What is claimed is:

1. A system for providing an electric acceleration assist to the landing gear of an aircraft for short takeoff, comprising:
   an electrical motor operably associated with landing gear of an aircraft and configured to control the rotation associated therewith;
   a battery operably coupled to the electrical motor and configured to supply power thereto; and
   an electronic motor controller configured to control the flow of electrical power between the battery and the electrical motor and the resultant torque associated with the electrical motor, the electronic motor controller adapted to communicate with the throttle and braking controls of the aircraft, wherein the electronic motor controller cooperates with one or more aircraft controls to provide power to the electrical motor as needed to control the rotation and corresponding land roll of the landing gear during aircraft takeoff or aircraft landing and to provide said electric acceleration assist to said landing gear for said short take-off.

2. The system according to claim 1, wherein the electronic motor controller cooperates with the throttle control to provide power to the electrical motor to increase the rotational torque of the landing gear and thus acceleration of the aircraft during aircraft takeoff.

3. The system according to claim 1, wherein the electronic motor controller cooperates with the brake control to provide power to the electrical motor to decrease the rotational torque of the landing gear and thus deceleration of the aircraft during aircraft landing.

4. The system according to claim 3, wherein the electrical motor is configured to convert the kinetic energy from the deceleration of the aircraft to electric energy for charging the battery.

5. The system according to claim 1, wherein the electrical motor is integrated into the landing gear.

6. The system according to claim 1, wherein the electrical motor includes one or more gear boxes operatively engaged to an axle of a wheel of the landing gear.

7. The system according to claim 1, wherein an electrical motor is operatively associated with each wheel of the landing gear.

8. The system according to claim 7, wherein each electrical motor of each wheel of the landing gear includes an electronic motor controller.

9. The system according to claim 7, wherein each electrical motor of each wheel of the landing gear is cooperatively coupled to the electronic motor controller.

10. The system according to claim 1, wherein the battery is part of a battery system that powers the aircraft, the battery configured to at least partially isolate from the battery system during use with the electronic motor controller.

11. The system according to claim 1, wherein the electronic motor controller cooperates with both conventional brake and throttle controls to regulate the electrical motor associated with landing gear.

12. The system according to claim 11, further comprising an algorithm configured to control communications between the electronic motor controller and the conventional brake and throttle controls to maximize the efficiency of the electrical motor during takeoff and landing of the aircraft.

13. A system for providing an electric acceleration assist to the landing gear of an aircraft for short takeoff, comprising:
   an electrical motor integrally associated with at least one wheel of the landing gear and configured to control the rotation associated therewith;
   a battery operably coupled to the electrical motor and configured to supply power thereto; and
   an electronic motor controller configured to control the flow of electrical power between the battery and the electrical motor and the resultant torque associated with the electrical motor, the electronic motor controller adapted to communicate with at least one of a throttle control or a brake control of the aircraft, wherein the electronic motor controller cooperates with the at least one of the throttle or brake controls of the aircraft to provide power to the electrical motor to increase or decrease the rotational torque of the at least one wheel of the landing gear during aircraft takeoff and landing and to provide said electric acceleration assist to said landing gear for said short takeoff.

14. The system according to claim 13, wherein the electrical motor is configured to convert the kinetic energy from the deceleration of the aircraft to electric energy for charging the battery.

15. A system for providing an electric acceleration assist to the landing gear of an aircraft for short takeoff, comprising:
   an electrical motor;
   a gear box operably coupled to the electrical motor and operably engaged an axle of at least one wheel of the landing gear, the electrical motor and the gear box cooperating to control the rotation of the at least one wheel associated therewith;
   a battery operably coupled to the electrical motor and configured to supply power thereto; and
   an electronic motor controller configured to control the flow of electrical power between the battery and the electrical motor and the resultant torque associated with the electrical motor, the electronic motor controller adapted to communicate with at least one of a throttle control or a brake control of the aircraft, wherein the electronic motor controller cooperates with the at least one of the throttle or brake controls of the aircraft to provide power to the electrical motor to increase or decrease the rotational torque of the at least one wheel of the landing gear during aircraft takeoff and landing and to provide said electric acceleration assist to said landing gear for said short takeoff.

16. The system according to claim 15, wherein the electric motor is configured to convert the kinetic energy from the deceleration of the aircraft to electric energy for charging the battery.

* * * * *